Sept 17, 1957 G. HENNIG 2,806,365
OSCILLATION SUPPRESSING DEVICE
Filed May 5, 1955 3 Sheets-Sheet 1

Inventor:
Gustav Henning
By:
Michael S. Struker
agt.

Sept 17, 1957 G. HENNIG 2,806,365
OSCILLATION SUPPRESSING DEVICE
Filed May 5, 1955 3 Sheets-Sheet 2

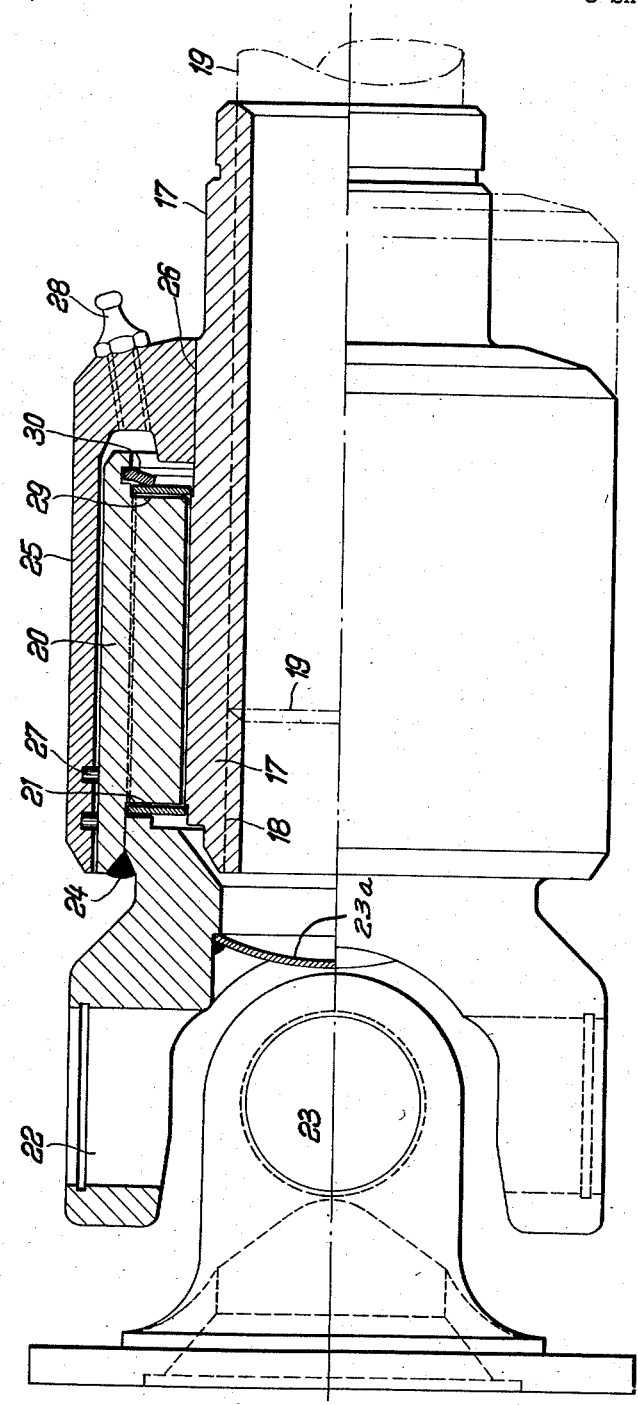

United States Patent Office 2,806,365
Patented Sept. 17, 1957

2,806,365
OSCILLATION SUPPRESSING DEVICE
Gustav Hennig, Essen, Germany
Application May 5, 1955, Serial No. 506,316
15 Claims. (Cl. 64—27)

The present invention relates to oscillation supressing devices, and more particularly to an oscillation suppressing device provided in a torque transmitting arrangement.

In transmissions and similar torque transmitting arrangements it is not possible to make tolerances so small as would be desirable. Consequently, there is always a certain play present in gear transmissions. The play between the flanks of the gears results in oscillations and vibrations which particularly in motor cars and railroad vehicles cause noise in the transmission arrangement which is particularly noticeable during idling of the transmission when the viscosity of the oil is reduced due to an increase of temperature during preceding operation of the motor.

Due to the uneven running of the drive motor and under the influence of the inertia forces acting on the parts of the gear transmission, the transmitted torque fluctuates and pushing and pulling forces alternate whereby the gear flanks engage each other and are separated from each other due to the play between the same whereby a rattling noise of audible frequency is produced which is frequently amplified by resonance of the surrounding structure and becomes very disturbing. Similar phenomena occur not only in motor cars but also in buses, ships and rail vehicles.

Particularly in vehicles for locomotion on land, a fluctuating torque is caused by the continuously changing driving conditions since the driving torqe is opposed by torque produced by inertia of the parts of the vehicle. Fluctuating torque particularly occurs when gears are shifted, and when the driving torque of the motor is reduced. Under such conditions the play between the gear flanks causes oscillations resulting in an annoying noise.

As is well known, rotary torque transmitting shafts, particularly hollow shafts as are used in motor cars have critical speeds of rotation at which undesirable resonance oscillations are particularly great which may result in acoustic disturbances, unduly high bearing stresses, and stressing of the materials beyond breaking point. Universal joint shafts which include portions extending at an angle to each other are particularly susceptible to the unfavorable resonance oscillations when driven by a piston engine.

It is the object of the present invention to overcome the detrimental effects of undesired oscillations in torque transmitting arrangements by an antiresonant device which suppresses or at least dampens oscillations and vibrations in the manner of an antiresonant suppression circuit as used for radio frequencies.

It is another object of the present invention to provide in a torque transmitting arrangement an antiresonant resilient means for suppressing resonance oscillations and vibrations caused by fluctuating torque.

It is a further object of the present invention to provide an oscillation suppressing device including coupling means and antiresonant resilient means connecting the coupling means and being composed of metal springs and resilient cushions.

It is yet an object of the present invention to provide an oscillation suppressing device including spring means for resiliently taking up oscillations, and resilient cushion means for transmitting the full load torque when the spring means are so deformed as not to act any more as resilient means.

With these objects in view the present invention mainly consists in an antiresonant resilient means arranged betwee the drive means and the driven means in a torque transmitting arrangement whereby undesired oscillations and vibration are suppressed in the manner of an antiresonant suppression circuit for radio frequencies. The term "antiresonant" as applied in the present application denotes that the resilient means are so designed as to be particularly effective in a particular transmission arrangement when resonance oscillations occur.

Preferably, the antiresonant resilient means comprise an arcuate metal leaf spring, and a resilient cushion consisting of rubber, polyvinyl chloride, polyvinyl acetate, or similar materials. Rubber cushions are advantageously vulcanized to the metal leaf springs.

According to a preferred embodiment of the present invention, the oscillation suppressing device comprises, in combination, first tubular coupling means adapted to be driven and including a set of internal claws extending in axial direction of the first tubular coupling means and having substantially radially extending first lateral faces; second rotary coupling means adapted to be connected to power takeoff means and being located within the first tubular coupling means, the second coupling means including a set of external claws extending in axial direction and having substantially radially extending second lateral faces, each of the external claws being located between two of the internal claws with the second lateral faces located opposite and spaced from the first lateral faces; and a set of antiresonant resilient means, each resilient means composed of an arcuate metal leaf spring having ends abutting against one of the second lateral faces, and of a resilient cushion means fixedly secured to the convex side of the metal leaf spring and extending along the entire length of the same and abutting against one of the first lateral faces, the set of antiresonant resilient means spacing the sets of internal and external claws apart for suppressing oscillations in the torque transmitting arrangements while transmitting torque.

According to one embodiment of the present invention, the two coupling means are provided with flanges for being connected to torque transmitting shafts. According to another embodiment of the present invention, the outer coupling means is connected to a universal joint, while the inner coupling means is tubular and has an inner surface provided with axially extending projections and recesses for receiving a splined shaft portion. This arrangement permits an axial adjustment of the inner coupling means.

It will be understood that according to the present invention the antiresonant means are preferably more sensitive to oscillations than the transmission elements whose oscillations and vibrations are to be suppressed.

The base circles and crown circles of the claw means are preferably so chosen that it is possible to correct an error in alignment of the connected shafts by transversely adjusting the two coupling means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 5 is a side view of another embodiment of the present invention, partly in axial section.

Figure 1:
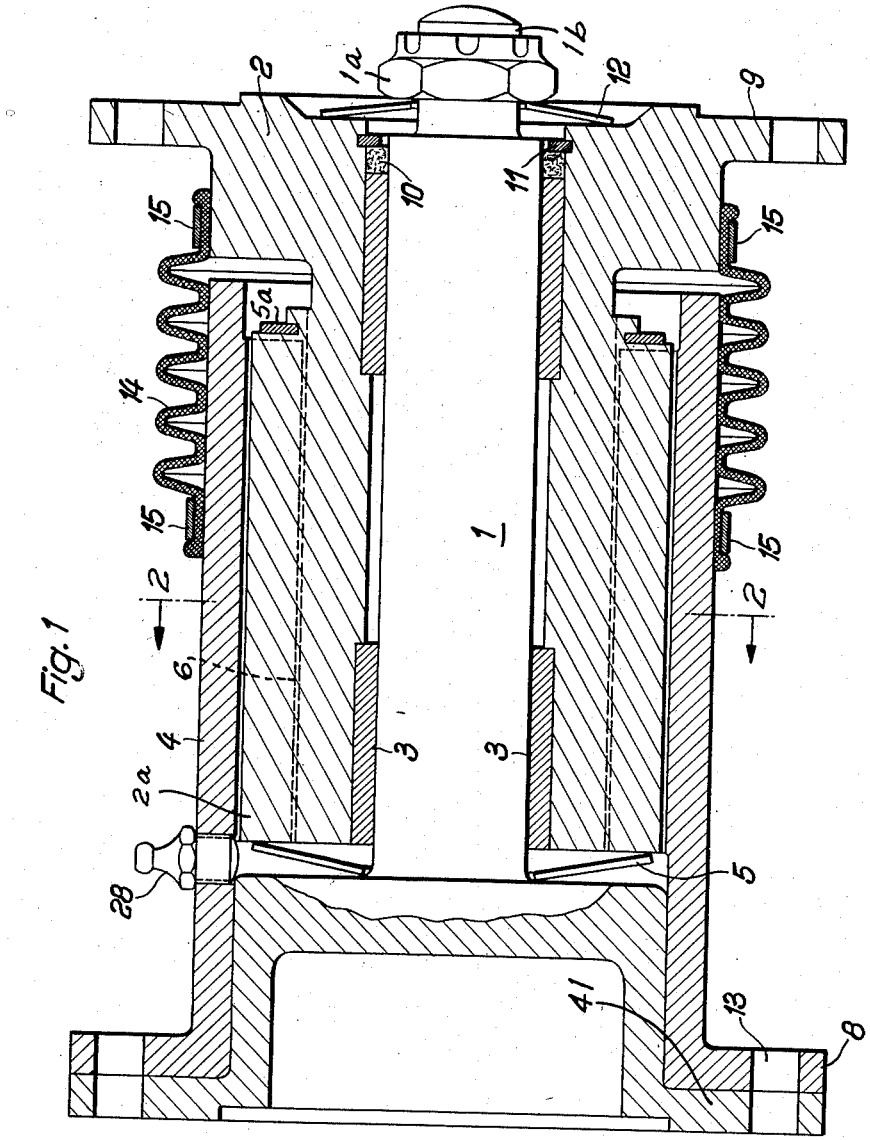
Fig. 1 is an axial sectional view of an oscillation suppressing device according to one embodiment of the present invention.
Figure 2:
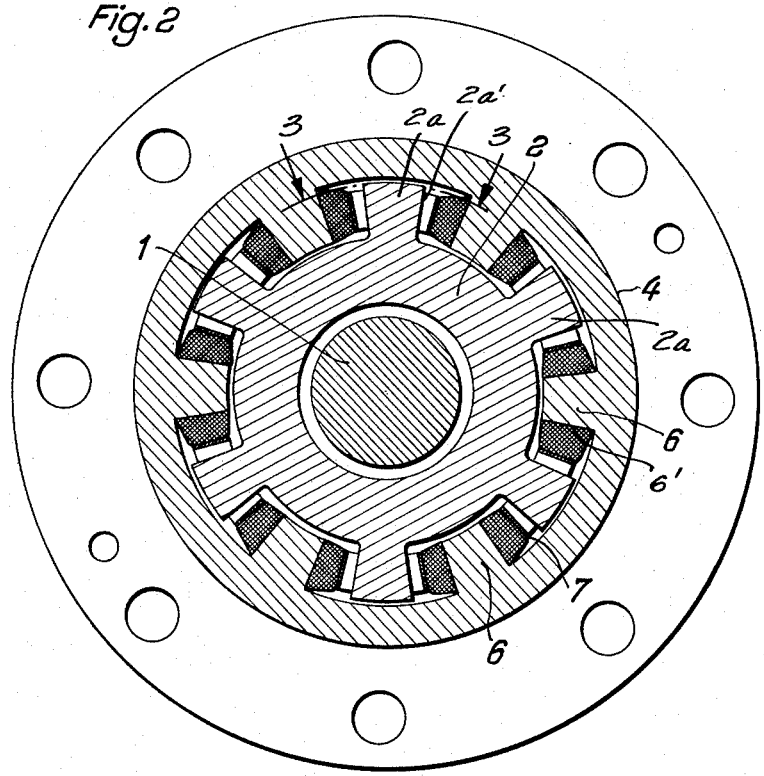
Fig. 2 is a cross-sectional view taken on line 2—2 in Fig. 1.

Referring now to the drawing, and more particularly to Figs. 1 and 2, an outer coupling means 4 is provided with internal claws 6 which extend inwardly in substantially radial direction. A flange means 41 is connected to the flange 8 of the outer coupling means 4 by bolts passing through the bores 13 which also serve for connecting the device to a drive means. A shaft means 1 is fixedly connected to the flange means 41 and projects into the interior of a second inner coupling means 2 which is provided with external claws 2a projecting into the spaces between adjacent internal claws 6. The claw means 2a and 6 have lateral faces 2a' and 6' which extend in substantially radial direction but are preferably not parallel in the position illustrated in Fig. 2 for reasons which will be explained hereinafter. The inner coupling means is provided with a flange 9 for being connected to a power take-off means. It will be understood that the position of the flanges 41 and 9 with respect to the drive means may be reversed. Bearing sleeves 3 are secured to the inner coupling means 2 so that the same is turnable on the shaft means 1 to a limited extent. The space within the coupling means 2 and 4 is closed by bellows 14 which are clamped to coupling means 2 and 4 by means of rings 15. The bellows 14 preferably consist of rubber which is vulcanized to the surface of coupling means 2 and 4 to assure a fluid-tight seal. A lubricating nipple 28 is provided in a bore of coupling means 4 so that the space within the coupling means may be filled with a lubricant. The bearing sleeves 3 preferably consist of a self-lubricating metal, such as sinter bronze.

Packing ring means 10 are provided for closing the inner space, and are held in place by a metal ring 11 mounted in a groove of coupling means 2. In the space between the flange means 41 and the claws 2a of the inner coupling means 2, a dished annular spring means 5 is provided which is tensioned by the nut 1a screwed onto a threaded extension 1a of the shaft 1 and engaging another dished annular spring means 12 whose outer periphery abuts against an end face in the flange 9 of the coupling means 2. The spring means 5 and 12 are provided for taking up axial forces which may occur during operation. A stop means 5a is provided for limiting axial movement of the claws 2a and 6 relative to each other, and is preferably a ring mounted in an annular groove in an inner portion of the coupling means 2. The spring 5 limits axial movement of the claws 2a at the other end of the same.

Figure 3:
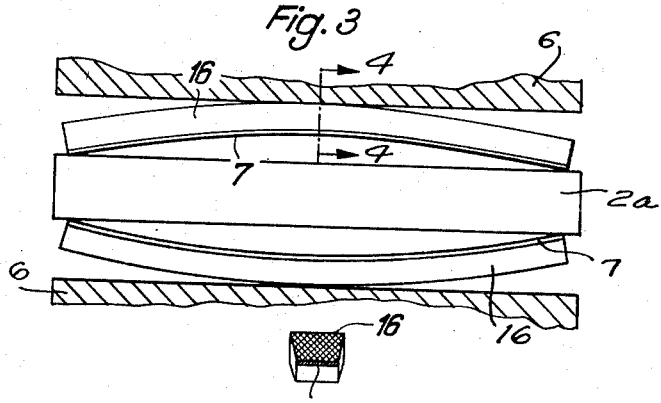
Fig. 3 is a fragmentary sectional view taken on line 3—3 in Fig. 2.
Figure 4:
Fig. 4 is a cross-sectional view taken on line 4—4 in Fig. 3 and illustrating an anti-resonant resilient means according to the present invention.

As is best seen in Fig. 2, antiresonant resilient means are provided between the opposite lateral faces 2a' and 6' of the claw means 2a and 6 whereby the claws are resiliently spaced apart. The antiresonant resilient means are composed of leaf springs 7, preferably consisting of metal, and of prismatic resilient cushions 16, preferably consisting of rubber or of a synthetic resilient material. The leaf springs 7 are arcuate and abut at the ends thereof against the lateral faces 2a' of the external claws 2a so that the center portion of the resilient cushion means 16 abuts against the lateral faces 6' of the internal claws 6 of the outer coupling means 4. Fig. 3 illustrates this arrangement, and Fig. 4 shows a cross section through an antiresonant resilient means from which it will be seen that the prismatic rubber cushion 16 is of trapezoidal cross section and attached with a narrower base face thereof to the leaf spring 7. The resilient cushion 16 is adhesively secured to the leaf spring 7 and in the event that it is made of rubber it is preferably vulcanized to the leaf spring 7.

During operation of the oscillation suppressing device according to the present invention, torque fluctuations are taken up by resilient deformation of the leaf springs 7. When full load is transmitted, the torque is sufficiently great to flatten the leaf springs 7 so that they engage the claws 2a along the entire length thereof, while the rubber cushion 16 engages the associated claw 6 along the entire length thereof. Consequently, the full load torque is transferred by the resilient cushions 16 while the more sensitive arcuate leaf springs 7 are not effective.

In order to obtain the most favorable conditions during normal operation, the lateral faces 2a' and 6' of the claws 2a and 6 are so inclined with respect to each other that opposite faces of the claws 2a and 6 are parallel when the resilient means 7, 16 are completely flattened.

The set of resilient means 7, 16 arranged on one side of the set of claws 2a is effective during rotation in one direction, and the set of resilient means 7, 16 arranged on the other side of the set of claws 2a is effective during rotation in opposite direction.

Another embodiment of the present invention is constructed for use particularly with a universal joint shaft means, and illustrated in Fig. 5. The inner coupling means 17 has external claws, and the outer coupling means 20 has internal claws arranged and cooperating with each other in the manner described with reference to Figs. 1 and 2. Antiresonant resilient means as shown in Figs. 3 and 4 are arranged between the external and internal claws in the manner shown in Fig. 2, and the arrangement operates in the same manner as described with respect to the first embodiment of the present invention.

The part 22 of a universal joint 23, which is connected to drive means, is welded or otherwise fixedly attached to the coupling means 20, the welding seam being designated by reference numeral 24. In contrast to the embodiments of Figs. 1 and 2, the tubular inner coupling means 17 does not have a bearing surface, but is provided with projections and recesses 18 extending in axial direction and engaging corresponding projections and recesses on a splined shaft portion 19 which is part of a power take-off shaft or driven shaft. The projections and recesses 18 permit axial adjustment of the coupling means 17 on the shaft 19. Stop means are provided for limiting axial movement of the coupling means 17 relative to the coupling means 20, and are illustrated to be hardened and ground spacing rings 21 and 29. Ring 21 is mounted in a groove of the coupling means 20, and ring 29 is resiliently urged toward the claws by means of a resilient dished split ring 30 mounted in an annular groove of coupling means 20.

A cover sleeve means 25 is pressed on a conical face 26 of the inner coupling means 17 and is held by the self-locking action of the conical face 26. The cover sleeve means 25 extends over the outer coupling means 20 and is provided with packing rings 27 by which the space within the cover sleeve 25 and within the coupling means 20 and 17 is closed so that it can be filled with a lubricant through the nipple 28. A sealing means 23a is provided for closing the inner space with respect to the universal joint 23.

According to the present invention the antiresonant resilient means 7, 16 are dimensioned to suppress vibrations and oscillations occurring in the torque transmitting arrangement in which the oscillation suppressing device of the present invention is provided. The resilient 7, 16 are more sensitive to oscillations than gear transmission means and other elements having play permitting oscillations. On the other hand, the flattened resilient means 7, 16 are capable of transmitting the full load. The resilient prismatic cushions 16 define the position of the metal leaf springs 7 and prevent an engagement of the lateral faces of the claws when during operation the torque fluctuates from positive values to negative values which will occur during acceleration or deceleration of the vehicle and drive means due to inertia of the transmission elements.

The outer coupling means is preferably made of two parts as explained with reference to the drawing whereby the claws and the recesses between the same can be particularly accurately and economically made by a broach.

It will be understood that each of the elements described above, or two or more together, may also find a useful application in other types of oscillation suppressing devices differing from the types described above.

While the invention has been illustrated and described as embodied in oscillation suppressing device including antiresonant resilient means composed of arcuate leaf springs and resilient cushions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a torque transmitting arrangement, an oscillation suppressing device comprising, in combination, first rotary coupling means adapted to be driven and including first radially extending face means; second rotary coupling means adapted to be connected to power takeoff means and including second radially extending face means located opposite said first face means; and antiresonant resilient means located between said first and second face means for transmitting torque from said first coupling means to said second coupling means and adapted to suppress oscillations in the torque transmitting arrangement, said resilient means including arcuate spring means abutting at the ends thereof against one of said face means and having a center position spaced from the same, and resilient cushion means fixedly secured to the convex side of said arcuate spring means and engaging the other of said face means so that small relative displacements of said first and second coupling means due to torque fluctuations effect resilient deformation of said spring means while at a predetermined full load torque transmitted from said first coupling means to said second coupling means said arcuate metal leaf spring is flattened and abuts along the entire length thereof against said one face means so that the full load torque is transmitted through said resilient cushion means.

2. In a torque transmitting arrangement, an oscillation suppressing device comprising, in combination, first rotary coupling means adapted to be driven and including first radially extending face means; second rotary coupling means adapted to be connected to power takeoff means and including second radially extending face means located opposite said first face means; and antiresonant resilient means located between said first and second face means for transmitting torque from said first coupling means to said second coupling means and adapted to suppress oscillations in the torque transmitting arrangement, said resilient means including arcuate metal leaf spring means abutting at the ends thereof against one of said face means and having a center portion spaced from the same, and resilient cushion means fixedly secured to the convex side of said arcuate metal leaf spring means extending along the entire length of the same and engaging the other of said face means so that small relative displacements of said first and second coupling means due to torque fluctuations effect resilient deformation of said spring means while at a predetermined full load torque transmitted from said first coupling means to said second coupling means said arcuate metal leaf spring means is flattened and abuts along the entire length thereof against said one face means while said cushion means abuts along the entire length thereof against the other of said face means so that the full load torque is transmitted through said resilient cushion means.

3. In a torque transmitting arrangement, an oscillation suppressing device comprising, in combination, first rotary tubular coupling means adapted to be driven and including a set of internal claws extending in axial direction of said first tubular coupling means and having substantially radially extending first lateral faces; second rotary coupling means adapted to be connected to power takeoff means and being located within said first tubular coupling means, said second coupling means including a set of external claws extending in axial direction and having substantially radially extending second lateral faces, each of said external claws being located between two of said internal claws with said second lateral faces located opposite and spaced from said first lateral faces; and a set of anti-resonant resilient means, each resilient means including a metal leaf spring and a resilient cushion means secured to one side of said leaf spring, and being located between one of the first lateral faces and one of the second lateral faces and spacing the same from each other so that small relative displacements of said first and second coupling means due to torque fluctuations effect resilient deformation of said leaf springs for suppressing oscillations in the torque transmitting arrangement while full load torque is transmitted through said resilient cushion means.

4. In a torque transmitting arrangement, an oscillation suppressing device comprising, in combination, first rotary tubular coupling means adapted to be driven and including a set of internal claws extending in axial direction of said first tubular coupling means and having substantially radially extending first lateral faces; second rotary coupling means adapted to be connected to power takeoff means and being located within said first tubular coupling means, said second coupling means including a set of external claws extending in axial direction and having substantially radially extending second lateral faces, each of said external claws being located between two of said internal claws with said second lateral faces located opposite and spaced from said first lateral faces; and a set of anti-resonant resilient means, each resilient means composed of an arcuate metal leaf spring and resilient cushion means fixedly secured to the convex side of said metal leaf spring, each resilient means being located between one of the first lateral faces and one of the second lateral faces and spacing the same from each other so that small relative displacements of said first and second coupling means due to torque fluctuations effect resilient deformation of said leaf springs for suppressing oscillations in the torque transmitting arrangement while full load torque is transmitted through said resilient cushion means.

5. In a torque transmitting arrangement, an oscillation suppressing device comprising, in combination, first rotary tubular coupling means adapted to be driven and including a set of internal claws extending in axial direction of said first tubular coupling means and having substantially radially extending first lateral faces; second rotary coupling means adapted to be connected to power takeoff means and being located within said first tubular coupling means, said second coupling means including a set of external claws extending in axial direction and having substantially radially extending second lateral faces, each of said external claws being located between two of said internal claws with said second lateral faces located opposite and spaced from said first lateral faces;

and a set of antiresonant resilient means, each resilient means composed of an arcuate metal leaf spring having ends abutting against one of said second lateral faces and having a center portion spaced from the same, and of a resilient cushion means fixedly secured to the convex side of said metal leaf spring and extending along the entire length of the same and abutting against one of said first lateral faces, said set of antiresonant resilient means spacing said sets of internal and external claws apart so that small relative displacements of said first and second coupling means due to torque fluctuations effect resilient deformation of said leaf springs for suppressing oscillations in the torque transmitting arrangements while full load torque is transmitted through said resilient cushion means.

6. An oscillation suppressing device as set forth in claim 5 wherein at a predetermined torque corresponding to full power transmission said arcuate metal leaf springs are flattened so that only said resilient cushion means resiliently transmit torque between said first and second coupling means.

7. An oscillation suppressing device as set forth in claim 5 wherein said first lateral faces are parallel to said second lateral faces when said metal leaf springs are flattened.

8. An oscillation suppressing device as set forth in claim 5 wherein said first and second coupling means are movable relative to each other in axial direction, and including resilient stop means for limiting such axial movement.

9. An oscillation suppressing device as set forth in claim 5 and including a pair of annular stop means attached to said first coupling means and located at the ends of said internal claws, and limiting axial movement of said second coupling means by engaging the ends of said external claws, said external claws having a smaller axial extension than said internal claws.

10. A device as set forth in claim 9 wherein at least one of said annular stop means is an annular dished spring.

11. In a torque transmitting arrangement, an oscillation suppressing device comprising, in combination, first rotary tubular coupling means adapted to be driven and including a set of internal claws extending in axial direction of said first tubular coupling means and having substantially radially extending first lateral faces; second rotary tubular coupling means adapted to be connected to power takeoff means and being located within said first tubular coupling means, said second coupling means including a set of external claws extending in axial direction and having substantially radially extending second lateral faces, each of said external claws being located between two of said internal claws with said second lateral faces located opposite and spaced from said first lateral faces, said second tubular coupling means having inner cylindrical bearing face means; a shaft means fixedly secured to said first tubular coupling means projecting into said second tubular coupling means and having an outer cylindrical bearing face engaging said cylindrical bearing face; and a set of antiresonant resilient means, each resilient means including a metal leaf spring and a resilient cushion means secured to one side of said leaf spring, and being located between one of the first lateral faces and one of the second lateral faces and spacing the same from each other so that small relative displacements of said first and second coupling means due to torque fluctuations effect resilient deformation of said leaf springs for suppressing oscillations in the torque transmitting arrangement while full load torque is transmitted through said resilient cushion means.

12. In a torque transmitting arrangement, an oscillation suppressing device comprising, in combination, first rotary tubular coupling means adapted to be driven and including a set of internal claws extending in axial direction of said first tubular coupling means and having substantially radially extending first lateral faces; second rotary tubular coupling means having an inner surface formed with axially extending projections and recesses so as to be adapted to be connected to a splined power takeoff shaft adjustable in axial direction and being located within said first tubular coupling means, said second coupling means including a set of external claws extending in axial direction and having substantially radially extending second lateral faces, each of said external claws being located between two of said internal claws with said second lateral faces located opposite and spaced from said first lateral faces; and a set of antiresonant resilient means, each resilient means including a metal leaf spring and a resilient cushion means secured to one side of said leaf spring, and being located between one of the first lateral faces and one of the second lateral faces and spacing the same from each other so that small relative displacements of said first and second coupling means due to torque fluctuations effect resilient deformation of said leaf springs for suppressing oscillations in the torque transmitting arrangement while full load torque is transmitted through said resilient cushion means.

13. In a torque transmitting arrangement, an oscillation suppressing device comprising, in combination, first rotary tubular coupling means adapted to be driven and including a set of internal claws extending in axial direction of said first tubular coupling means and having substantially radially extending first lateral faces; second rotary tubular coupling means adapted to be connected to power takeoff means and being located within said first tubular coupling means, said second coupling means including a set of external claws extending in axial direction and having substantially radially extending second lateral faces, each of said external claws being located between two of said internal claws with said second lateral faces located opposite and spaced from said first lateral faces, said second tubular coupling means having inner cylindrical bearing face means; a shaft means fixedly secured to said first tubular coupling means projecting into said second tubular coupling means and having an outer cylindrical bearing face engaging said cylindrical bearing face; and a set of antiresonant resilient means, each resilient means composed of an arcuate metal leaf spring having ends abutting against one of said second lateral faces and having a center portion spaced from the same, and of a resilient cushion means fixedly secured to the convex side of said metal leaf spring and extending along the entire length of the same and abutting against one of said first lateral faces, said set of antiresonant resilient means spacing said sets of internal and external claws apart so that small relative displacements of said first and second coupling means due to torque fluctuations effect resilient deformation of said leaf springs for suppressing oscillations in the torque transmitting arrangements while full load torque is transmitted through said resilient cushion means.

14. A device as claimed in claim 13 wherein each resilient cushion means is prismatic and has a trapezoidal cross section and is adhesively attached at the narrower base face thereof to the associated leaf spring.

15. A device as claimed in claim 14 wherein said resilient cushion means is made of rubber and vulcanized to the associated leaf spring.

References Cited in the file of this patent

UNITED STATES PATENTS

| | | |
|---|---|---|
| 1,272,061 | Lake | July 9, 1918 |
| 2,327,389 | Bagnall | Aug. 24, 1943 |
| 2,477,175 | Gee | July 26, 1949 |

FOREIGN PATENTS

| | | |
|---|---|---|
| 57,885 | Sweden | Nov. 18, 1924 |